US012569786B2

(12) United States Patent
Kim

(10) Patent No.: US 12,569,786 B2
(45) Date of Patent: Mar. 10, 2026

(54) FILTER ASSEMBLY AND FOREIGN SUBSTANCE DISCHARGE DEVICE INCLUDING SAME

(71) Applicant: Chung-hyo Kim, Seoul (KR)

(72) Inventor: Chung-hyo Kim, Seoul (KR)

( * ) Notice: Subject to any disclaimer, the term of this patent is extended or adjusted under 35 U.S.C. 154(b) by 332 days.

(21) Appl. No.: 18/363,156

(22) Filed: Aug. 1, 2023

(65) Prior Publication Data

US 2024/0042352 A1 Feb. 8, 2024

(51) Int. Cl.
B01D 29/68 (2006.01)
B01D 29/44 (2006.01)
B01D 35/157 (2006.01)

(52) U.S. Cl.
CPC ............. B01D 29/68 (2013.01); B01D 29/44 (2013.01); B01D 35/1573 (2013.01)

(58) Field of Classification Search
CPC .... B01D 29/68; B01D 29/44; B01D 35/1573; B01D 29/6438; B01D 35/28; B01D 35/02; B01D 29/56; B01D 35/14; B01D 35/30; E03F 5/22; F04D 7/04; F04D 29/708; C02F 1/001
See application file for complete search history.

(56) References Cited

U.S. PATENT DOCUMENTS 3,278,035 A * 10/1966 Soegaard ............ B02C 18/0092
210/315

FOREIGN PATENT DOCUMENTS

| EP | 1860245 A1 * | 11/2007 | ............... E03F 5/22 |
| JP | 58141710 U | 9/1983 | |
| JP | 06233906 A | 8/1994 | |
| JP | 2003003561 A | 1/2003 | |
| JP | 2016147229 A | 8/2016 | |

* cited by examiner

*Primary Examiner* — Waqaas Ali

(74) *Attorney, Agent, or Firm* — NKL LAW; Jae Youn Kim

(57) ABSTRACT

Proposed is a filter assembly. The filter assembly includes: a housing configured to form a flow path for allowing a fluid to move in a first direction or a second direction opposite to the first direction; a plate inserted into the housing and formed therein with through-holes; and a plurality of protrusions protruding from the plate in the second direction.

5 Claims, 24 Drawing Sheets

1

500

FILTER ASSEMBLY AND FOREIGN SUBSTANCE DISCHARGE DEVICE INCLUDING SAME

BACKGROUND OF THE INVENTION

1. Field of the Invention

The present disclosure relates to a filter assembly and a foreign substance discharge device including the same, and more particularly, to a filter assembly and a foreign substance discharge device including the same to effectively filter foreign substances contained in a fluid by using protrusions protruding opposite to the moving direction of the fluid.

2. Description of the Related Art

When a fluid is heat-exchanged or pumped to a foreign substance discharge device while circulating along pipes, foreign substances contained in the fluid may unintentionally block the pump or pipe, and accordingly, the fluid in the foreign substance discharge device fails to smoothly move.

SUMMARY OF THE INVENTION

The present disclosure is intended to solve the above-mentioned problems. An object of the present disclosure is to provide a filter assembly and a foreign substance discharge device including the same to effectively filter foreign substances contained in a fluid by using protrusions protruding opposite to the moving direction of the fluid.

The filter assembly according to one embodiment of the present disclosure may include: a housing configured to define a flow path for allowing a fluid to move in a first direction or a second direction opposite to the first direction; a plate inserted into the housing and formed therein with a through-hole; and a plurality of protrusions protruding from the plate in the second direction.

The foreign substance discharge device according to one embodiment of the present disclosure may include: filter assembly including a housing configured to define a flow path for allowing a fluid to move in a first direction or a second direction opposite to the first direction, a plate inserted into the housing and formed therein with a through-hole, and a plurality of protrusions protruding from the plate in the second direction; and a pump configured to selectively move the fluid in the second direction.

DETAILED DESCRIPTION OF THE INVENTION

It will be understood that the embodiments herein are exemplarily described for the further understanding of the present disclose, and the present disclosure may be implemented with various modifications different from the embodiments described herein. However, for describing the present disclose hereinafter, the detailed description and specific illustration of the related known function or component incorporated herein will be omitted when it possibly makes the subject matter of the present disclose unclear unnecessarily. In addition, in order to facilitate understanding of the disclosure, the accompanying drawings are not shown as actual scale, and the dimensions of some components may be exaggerated.

The terms used in this specification and claims are general terms in consideration of the functions of the present disclosure. However, the terms may vary according to the intention of those skilled in the art, the legal or technical interpretation, the advent of new technology, and the like. In addition, some terms are arbitrarily selected by the applicant. The terms may be interpreted as defined in this specification, or may be interpreted based on the overall content of this specification and common technical knowledge in the art when there is no specific term definition.

In the specification herein, expressions such as "have", "may have", "includes," or "may include" indicate the presence of a corresponding feature (e.g., a number, a function, an operation, or a component such as part), and do not exclude the presence of additional features.

In addition, in this specification, since the components necessary for the description of each embodiment of the present disclosure are described, the present disclosure is not limited thereto. Accordingly, some components may be changed or omitted, and other components may be added. In addition, the components may also be distributed and disposed in different independent devices.

Further, hereinafter, the embodiments of the present disclosure will be described in detail with reference to the accompanying drawings and the contents described in the accompanying drawings, however, the present disclosure is not limited to or restricted by the embodiments.

Hereinafter, the present disclosure will be described in more detail with reference to the accompanying drawings.

Figure 1:
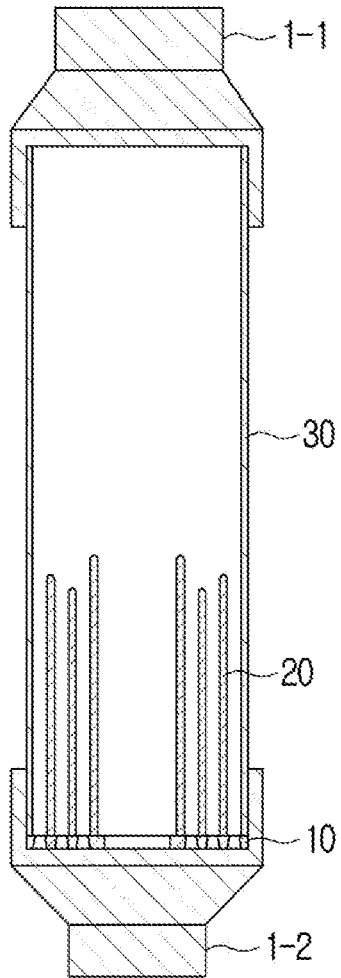
FIG. 1 is a sectional view showing a filter assembly according to one embodiment of the present disclosure.
Figure 2:
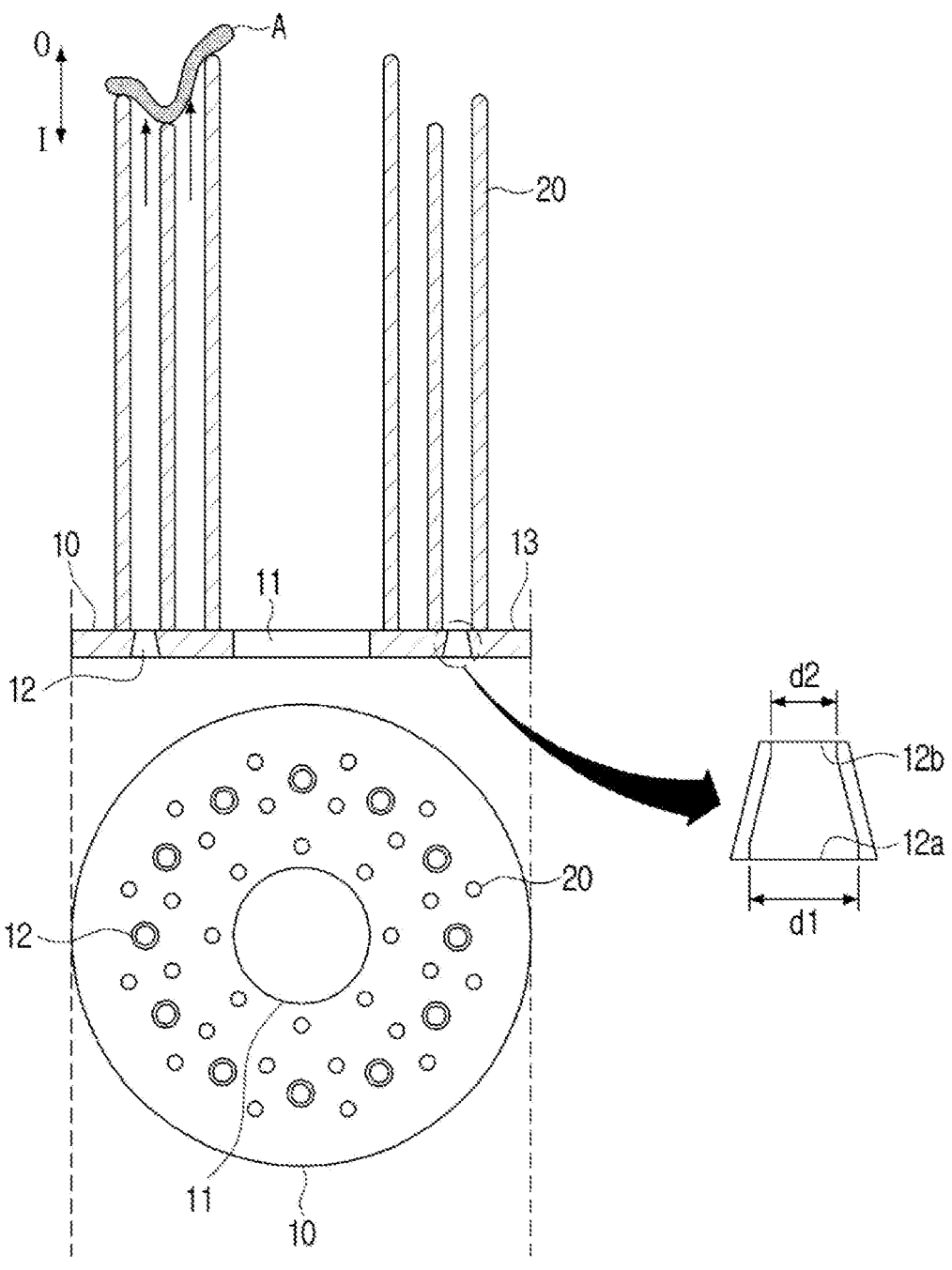
FIG. 2 is a view showing the filter assembly including a plate and a plurality of protrusions.

FIG. 1 is a sectional view showing a filter assembly according to one embodiment of the present disclosure. FIG. 2 is a view showing the filter assembly including a plate and a plurality of protrusions.

Referring to FIGS. 1 and 2, a filter assembly 1 according to one embodiment of the present disclosure may include a plate 10, a plurality of protrusions 20 and a housing 30.

The housing 30 may be formed with a flow path so that a fluid moves in a first direction I or a second direction opposite to the first direction. The plate 10 may be inserted into the housing and formed with through-holes 11 and 12. The protrusions 20 may protrude from the plate 10 in the second direction O.

When the fluid flows in the first direction I, a foreign substance A included in the fluid may be caught on the protrusions 20 and collected in the filter assembly 1.

When the fluid flows in the second direction O, the foreign substance A caught on the protrusions 20 may be separated and removed from the protrusions 20 together with the fluid.

The through-holes 11 and 12 may include a main hole 11 formed in a center of the plate and a plurality of spray holes 12 arranged to surround the main hole 11. The spray holes 12 may be arranged between the protrusions 20.

Most of the fluid may pass through the main hole 11 while flowing in the first direction I. When the fluid flows in the second direction O, the fluid may pass through the spray hole 12 and remove the foreign substance A caught on the protrusions 20.

The spray holes 12 may have a sectional area gradually decreased in the second direction O. One end 12*a* of the first direction I side of the spray hole 12 may have a first diameter d1, and an opposite end 12*b* of the second direction O side may have a second diameter d2, in which the first diameter d1 may be larger than the second diameter d2.

Accordingly, the fluid flowing in the second direction O may be increased in pressure and speed while passing through the spray hole 12, so that the foreign substance A caught on the protrusion 20 may be more easily removed.

FIGS. 3 to 9 are views schematically showing various structures of the filter assembly according to one embodiment of the present disclosure.

Figure 3:
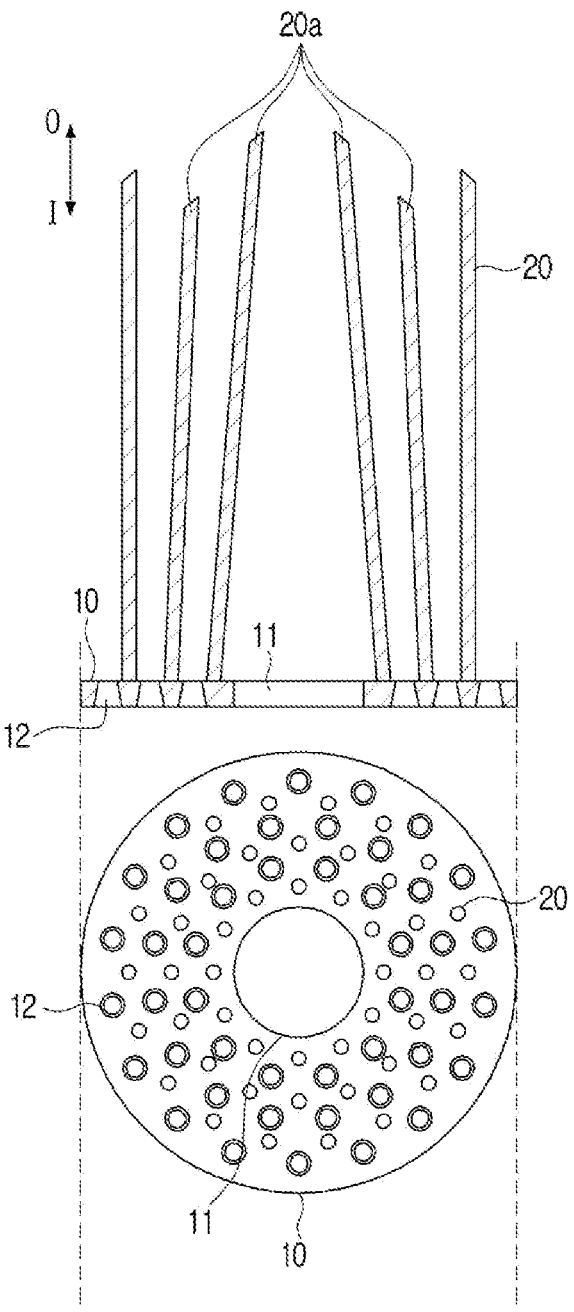
FIGS. 3 to 9 are views schematically showing various structures of the filter assembly according to one embodiment of the present disclosure.

Referring to FIG. 3, at least some 20*a* of the protrusions 20 may be formed to be inclined toward the main hole 11. Accordingly, the foreign substance A may be prevented from unintentionally passing through the main hole 11 having a large diameter.

Figure 4:
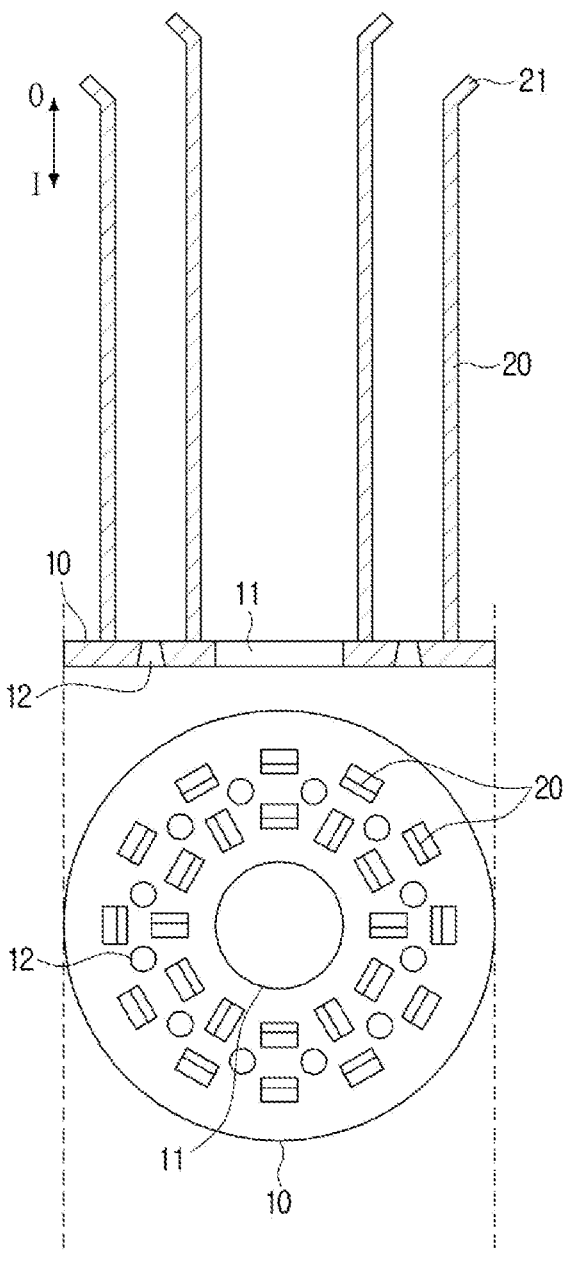

Referring to FIG. 4, at least some of the protrusions 20 may have one end 21 to be bent. The one end 21 of the bent protrusion 20 may be positioned farthest from the plate 10 among the protrusions 20. Accordingly, the area covered by the protrusions 20 is increased, so that the protrusions 20 may more easily filter the foreign substances A.

Figure 5:
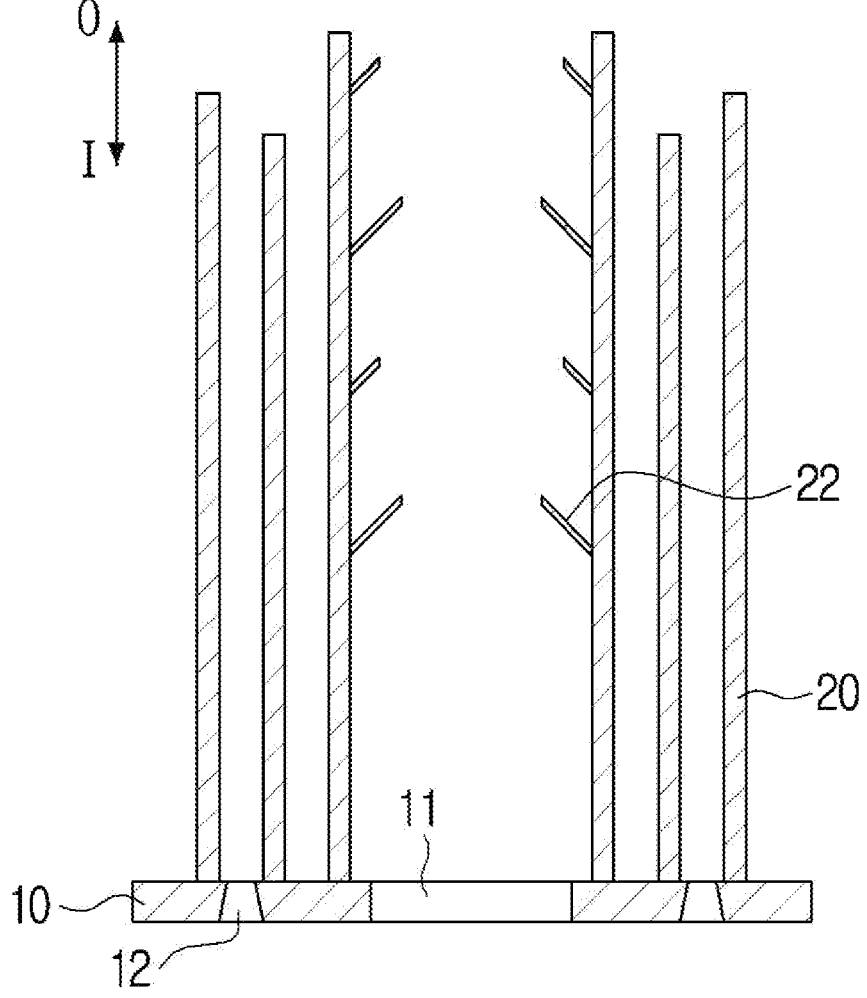
Figure 6:
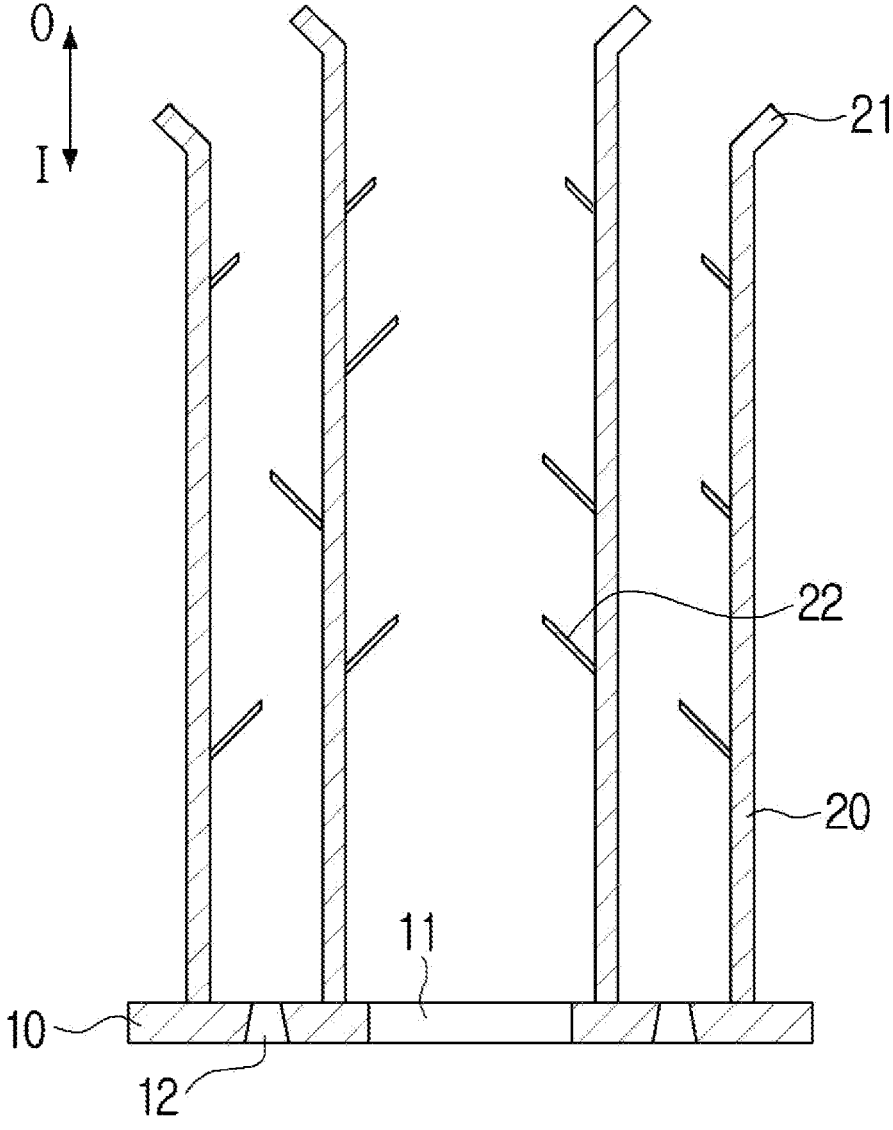

Referring to FIGS. 5 and 6, at least some of the protrusions 20 may include auxiliary protrusions 22 protruding from each side surface toward the second direction O. The auxiliary protrusion 22 may be inclined upward as extending from the side surface of the protrusion 20. Accordingly, the area covered by the protrusions 20 is increased, so that the protrusions 20 may more easily filter the foreign substances A.

Figure 7:
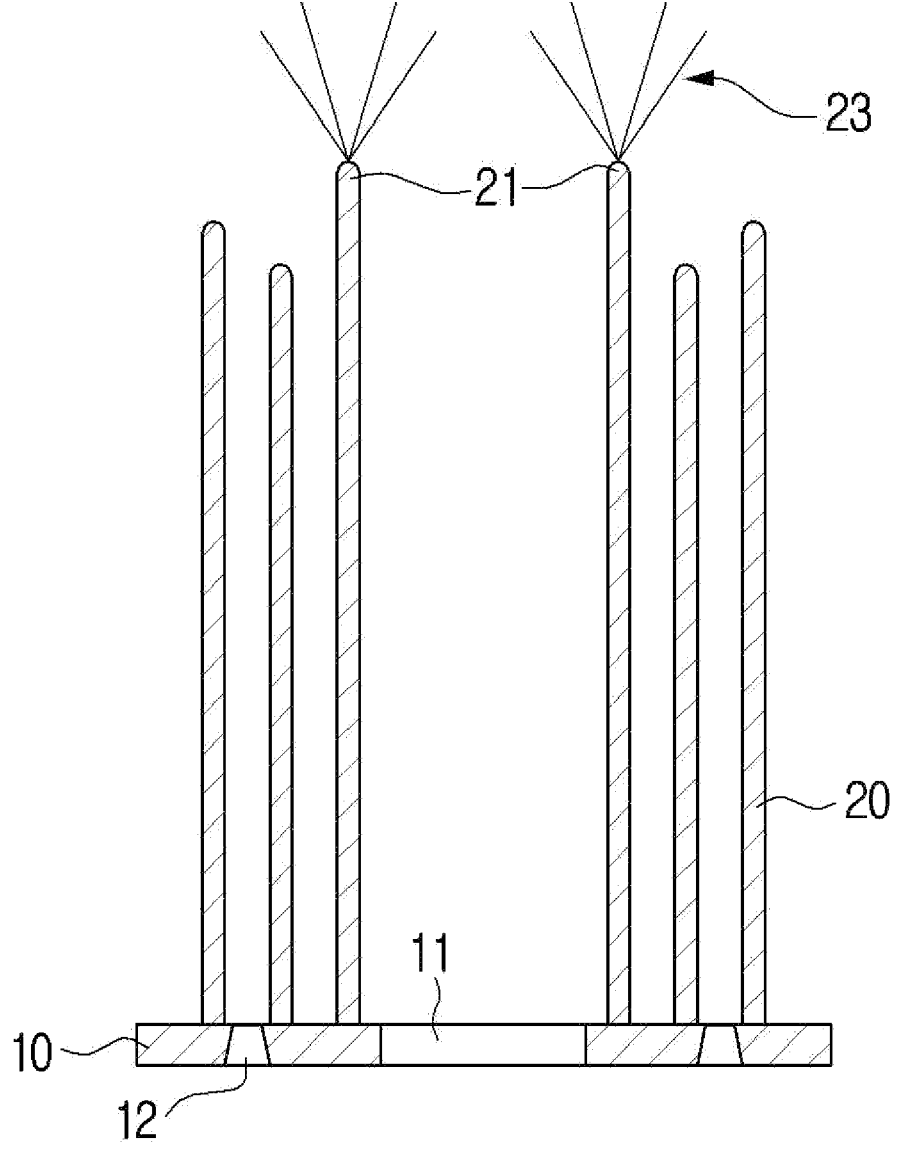

Referring to FIG. 7, at least some of the protrusions 20 may include radial protrusion 23 formed on the one end 21. A plurality of radial protrusion 23 may be provided to have a shape radially spreading from the one end 21 of the protrusion 20. Accordingly, the area covered by the protrusions 20 is increased, so that the protrusions 20 may more easily filter the foreign substances A.

Figure 8:
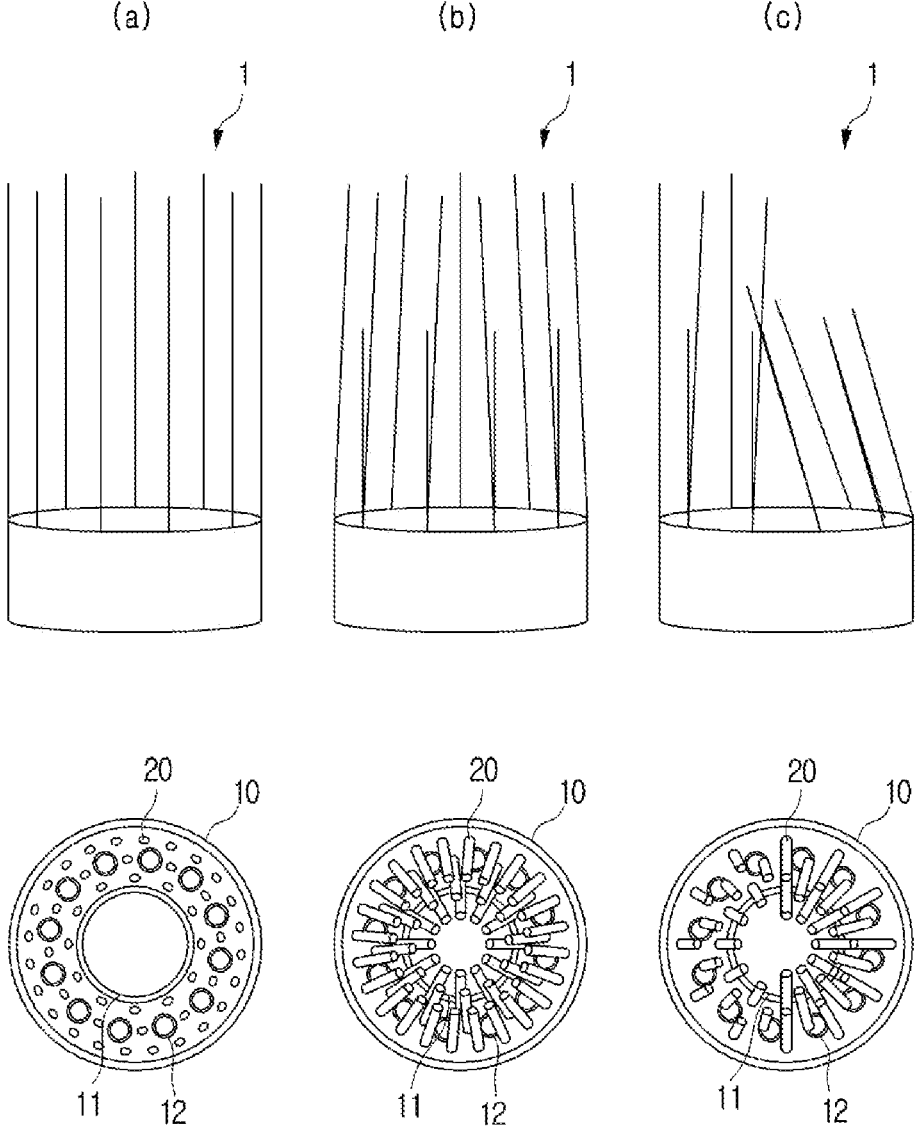

Referring to FIG. 8(*a*), the protrusions 20 may be formed perpendicularly to the plate 10. Referring to FIG. 8(*b*), all of the protrusions 20 may be formed to be inclined toward the main hole 11. Referring to FIG. 8(*c*), most of the protrusions 20 may be inclined toward the main hole 11, and some protrusions may be inclined more steeply than the others. Accordingly, the foreign substance A may be prevented from unintentionally passing through the main hole 11 having a large diameter. In addition, the area covered by the protrusions 20 is increased, so that the protrusions 20 may more easily filter the foreign substances A.

Figure 9:
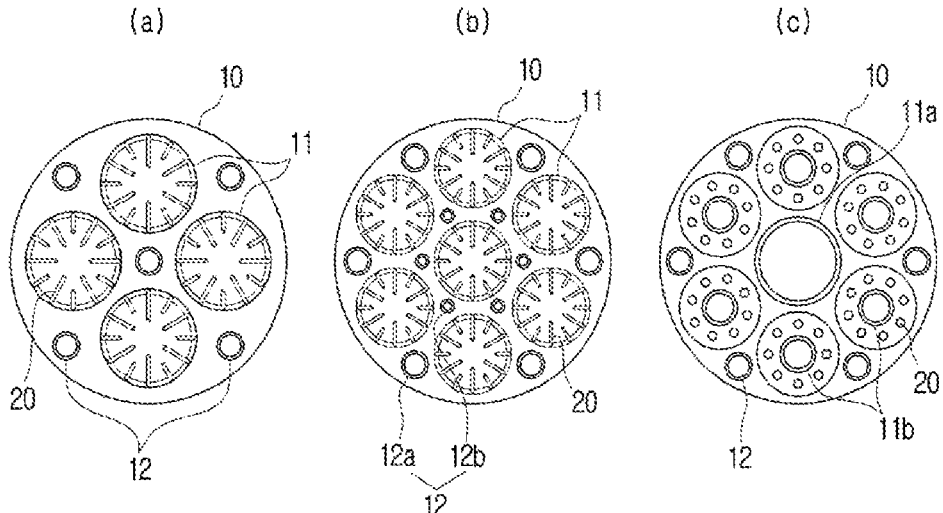

Referring to FIG. 9(*a*), four main holes 11 may be provided on top, bottom, left and right sides of the plate 10, respectively, five spray holes 12 may be provided between the main holes 11, and a plurality of protrusions 20 may be formed inclined toward each main hole 11.

Referring to FIG. 9(*b*), one main hole 11 may be provided at a center of the plate 10 and six main holes 11 surrounding the one main hole 11 may be arranged in a circumferential direction. The spray hole 12 may include first spray holes 12*a* arranged between the six main holes 11, respectively, and second spray holes 12*b* surrounding the main hole 11 arranged at the center. The protrusions 20 may be formed to be inclined along each main hole 11.

Referring to FIG. 9(*c*), one large main hole 11*a* may be provided at a center of the plate and six small main holes 11*b* surrounding the one large main hole may be arranged in a circumferential direction. The spray holes 12 may be arranged between the six main holes 11*b*, respectively. The protrusions 20 may be arranged to surround each of the six main holes 11*b*.

However, the illustrated structure of the above-described filter assembly 1 is exemplary, and the shape or number of the main hole 11, the spray hole 12, and the protrusion 20 is not limited thereto.

Figure 10:
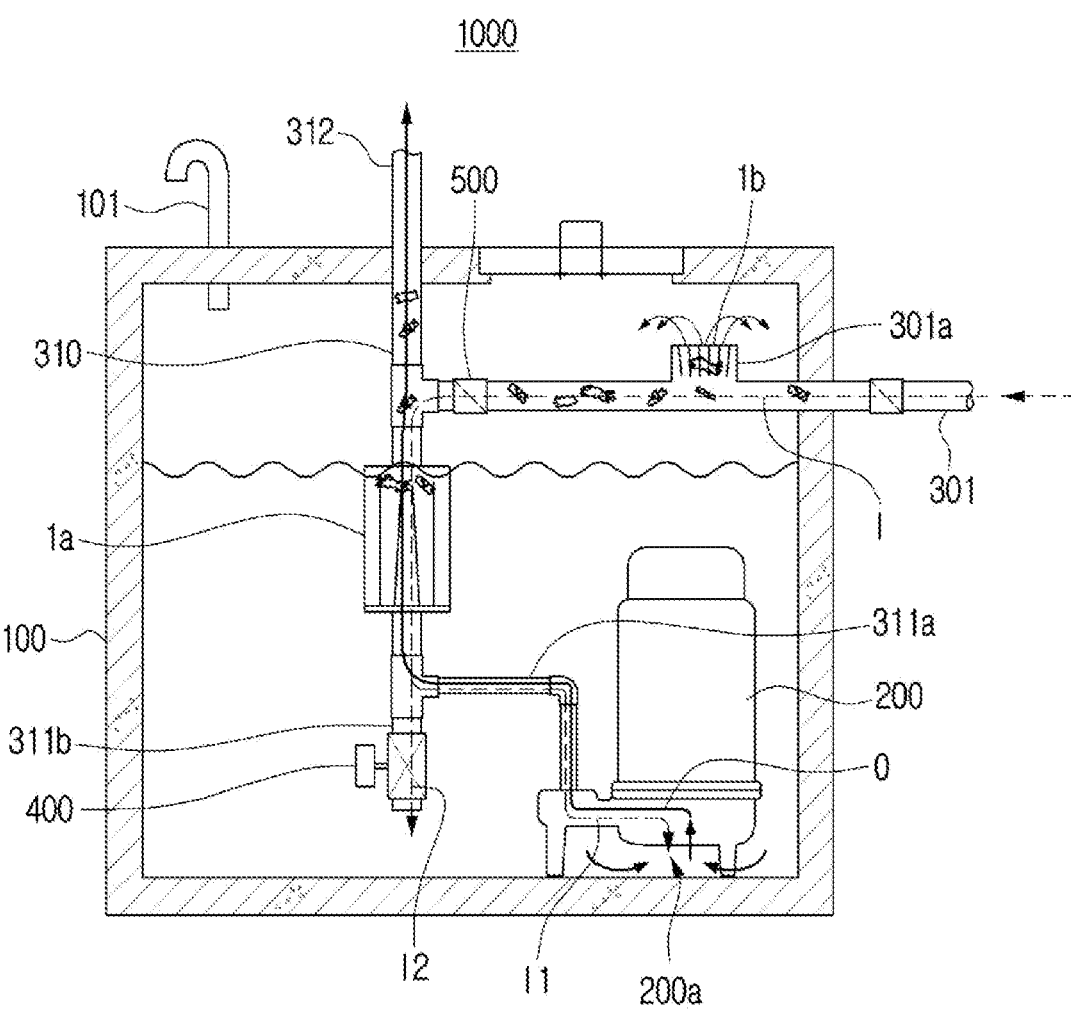
FIGS. 10 to 12 are views showing various structures of the foreign substance discharge device including an auxiliary filter or an auxiliary inlet.
Figure 11:
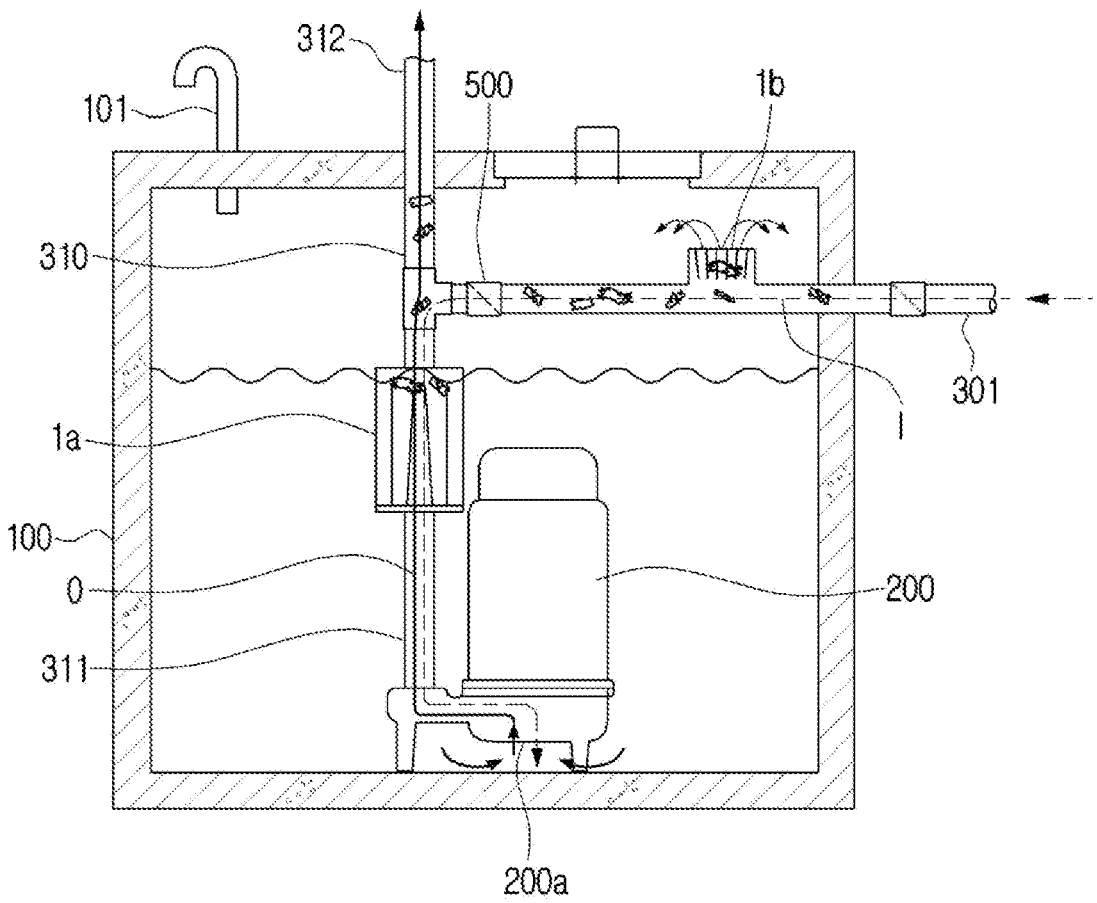
Figure 12:
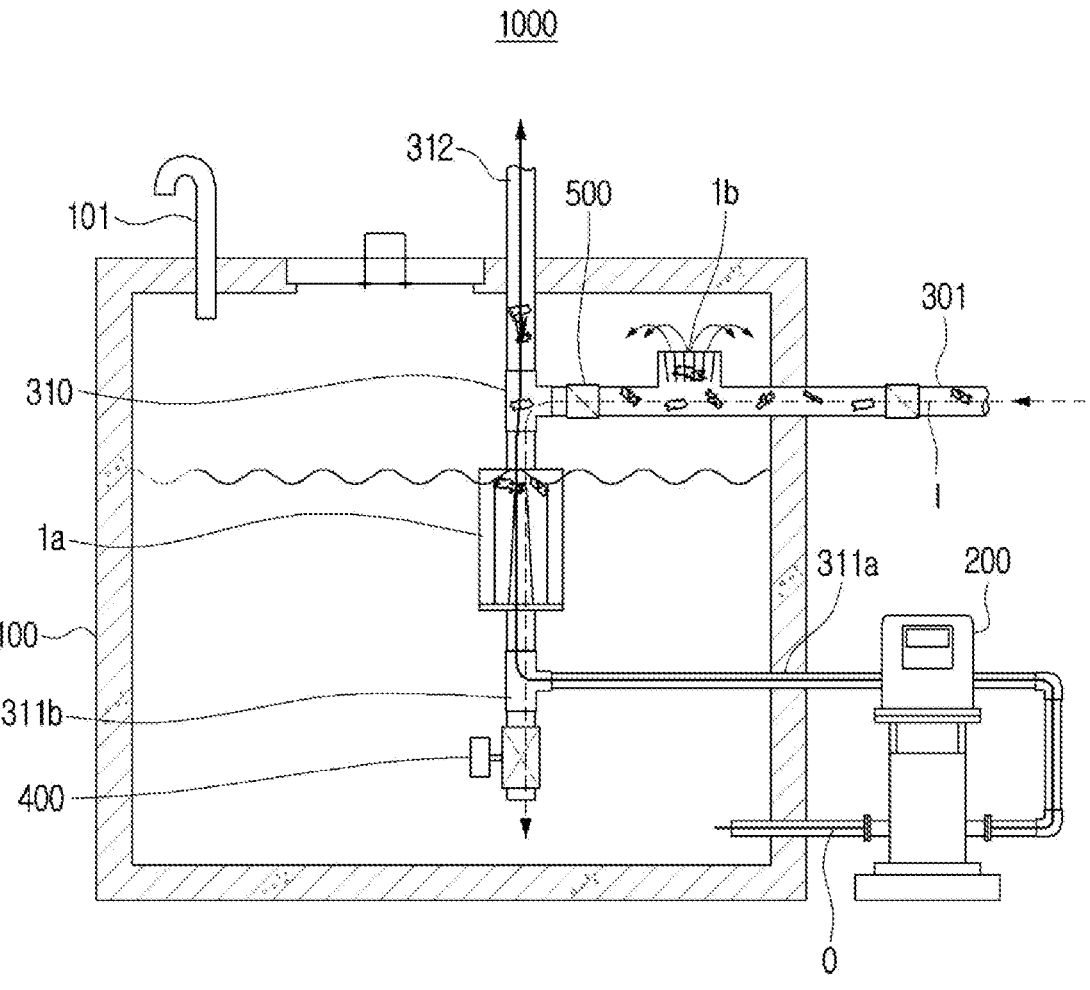

FIGS. 10 to 12 are views showing various structures of the foreign substance discharge device including an auxiliary filter or an auxiliary inlet.

Referring to FIGS. 10 to 12, the foreign substance discharge device 1000 according to one embodiment of the present disclosure may include the above-described filter assembly 1 and a pump 200. The pump 200 may selectively move the fluid in the second direction O. In other words, when the pump 200 is activated, the fluid may flow in the second direction O to remove foreign substances collected in the filter assembly 1.

For example, the foreign substance discharge device 1000 may be a sewage drainage device. The sewage drainage device may be a device located in a basement of a building or the like to store sewage generated from the building in the tank 100 and drain the sewage to the outside using the pump 200.

The foreign substance discharge device 1000 according to one embodiment of the present disclosure may include a tank 100 and pipes 301 and 310. The tank 100 may allow the sewage to be drawn thereto or discharged therefrom. The pipes 301 and 310 may communicate with the pump 200 to provide a movement path for sewage, and the filter assembly 1 may be inserted thereto. Since the pump 200 includes a lower hole 200*a*, sewage moving along the pipes 301 and 310 may be introduced into the tank 100 through the lower hole 200*a* via the pump 200.

In addition, while the sewage flows along the pipes 301 and 310, foreign substances included in the sewage may be filtered by the filter assembly 1.

For example, the foreign substance discharge device 1000 according to one embodiment of the present disclosure may include an inlet pipe 301 and a first pipe 310.

The sewage may be introduced into the tank 100 from the outside of the tank 100 through the inlet pipe 301.

The first pipe 310 may communicate with the inlet pipe 301. One end 311*a* and 311*b* of the first pipe 310 may be branched to communicate with insides of the pump 200 and the tank 100, respectively. The sewage may be discharged to the outside of the tank 100 through an opposite end 312 of the first pipe 310.

In other words, the sewage introduced into the tank 100 may be partially moved into the tank 100 via the pump 200, and partially moved into the tank 100 without passing through the pump 200. Accordingly, sewage may be rapidly introduced into the tank 100 through two paths.

The one end 311 of the first pipe 310 may include a first drainage part 311a communicating with the pump 200, and a second drainage part 311b communicating with the inside of the tank 100.

In other words, the sewage may be introduced along a flow path of I1 formed by the first drainage part 311a, and may also be introduced along a path of I2 formed by the second drainage part 311b.

The foreign substance discharge device 1000 may further include a valve device 400 configured to selectively open and close the second drainage part 311b. The valve device 400 may close the second drainage part 311b only when the pump 200 is driven.

In other words, since the valve device 400 opens the second drainage part 311b in a normal time when the pump 200 is not driven, sewage may be smoothly introduced into the tank 100.

In addition, when the pump 200 is driven, the sewage stored in the tank 100 may be discharged from the tank 100 via the pump 200 and the first pipe 310. At this timing, since the valve device 400 closes the second drainage part 311b, the sewage may be moved along the first drain part 311b and then easily discharged toward the opposite end 312 of the first pipe 310 without being leaked into the second drainage part 311b.

The inlet pipe 301 may include an auxiliary hole 301a having a top that opens to communicate with the inside of the tank 100.

In other words, sewage flowing through the inlet pipe 301 may be introduced into the tank 100 through the ends 311a and 311b of the first pipe 310 due to the gravity. In this case, a portion of the sewage flowing through the inlet pipe 301 may be introduced into the tank 100 through the auxiliary hole 301a. Accordingly, when a large amount of sewage is introduced into the inlet pipe 301, sewage may be introduced into the tank 100 through the auxiliary hole 301a, so that a sewage congestion phenomenon may be prevented.

In addition, when the pump 200 is driven, a backflow prevention device 500 may be closed, so that the sewage inside the tank 100 may be discharged to the outside of the tank 100 through the first pipe 310. Accordingly, when the backflow prevention device 500 is in the closed state, the sewage flowing into the inlet pipe 301 may pass through the auxiliary hole 301a and smoothly flow into the tank 100.

The filter assemblies 1a and 1b may include a main filter 1a inserted into the first pipe 310, and an auxiliary filter inserted into the auxiliary hole 301a.

Accordingly, since the sewage introduced into the auxiliary hole 301a is filtered by the auxiliary filter 1b, foreign substances may be prevented from being unintentionally leaked into the tank 100.

Referring to FIG. 12, the pump 200 may be disposed outside of tank 100. The first drainage part 311a may have one section disposed outside the tank to pass the pump 200. Since the pump 200 is disposed outside the tank 100, a conventional pump may be used instead of a submersible pump, so that costs may be reduced.

Figure 13:
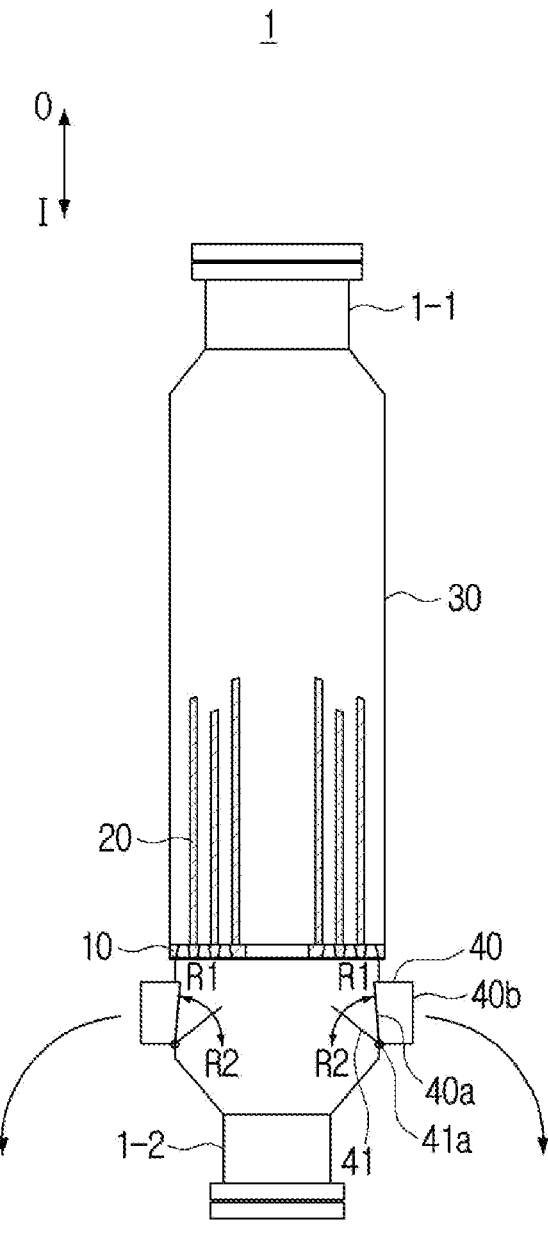
FIG. 13 is a view showing a structure of an auxiliary pipe opened and closed by a cover.

FIG. 13 is a view showing a structure of an auxiliary pipe opened and closed by a cover.

Referring to FIG. 13, the filter assembly 1 according to one embodiment of the present disclosure may include an auxiliary pipe 40 and a cover 41.

The auxiliary pipe 40 may have one end 40a communicating with a side of the housing 30, and an opposite end 40b positioned in the tank 100 in an opened state.

The cover 41 may have one end 41 rotatably connected to a lower side of the one end 40a of the auxiliary pipe, so as to selectively open and close the one end 40a of the auxiliary pipe.

Specifically, the cover 41 may be disposed on an inlet and outlet flow path, so as to be pushed and rotated by sewage flowing in the inlet direction I or in the discharge direction O.

In other words, when the pump 200 is activated, the cover 41 may be rotated in a first direction R1 by the sewage flowing in the discharge direction O, thereby closing the one end 40a of the auxiliary pipe 40. In addition, when the pump 200 is not operated, the cover 41 may be rotated in a second direction R2 by the sewage flowing in the inlet direction I, thereby opening the one end 40a of the auxiliary pipe 40.

Accordingly, some of the sewage introduced through the pipes 301 and 310 may flow directly into the tank 100 through the auxiliary pipe 40 without flowing to the pump 200.

In addition, as described above, when the pump 200 is operated, the cover 41 may close the one end 40a of the auxiliary pipe 40, so that the sewage may be stably discharged to the outside of the tank 100 without flowing out through the auxiliary pipe 40.

In addition, the auxiliary pipe 40 may be disposed on a downstream side of the plate 10 based on the inlet direction I of the sewage. Accordingly, foreign substances in the sewage may be preemptively filtered by the protrusions 20, so that only the sewage having no foreign substances may be introduced into the tank 100 through the auxiliary pipe 40.

Since the auxiliary pipe 40 provides a bypass path for the introduced sewage, the sewage may be dispersed through the auxiliary pipe 40 and introduced into the tank 100 even without passing through the drainage pump 200.

When the flow rate of inlet sewage is high, some of the inlet sewage may directly flow into the tank 100 through the auxiliary pipe 40, so that congestion in pipes due to sewage may be prevented.

Figure 14:
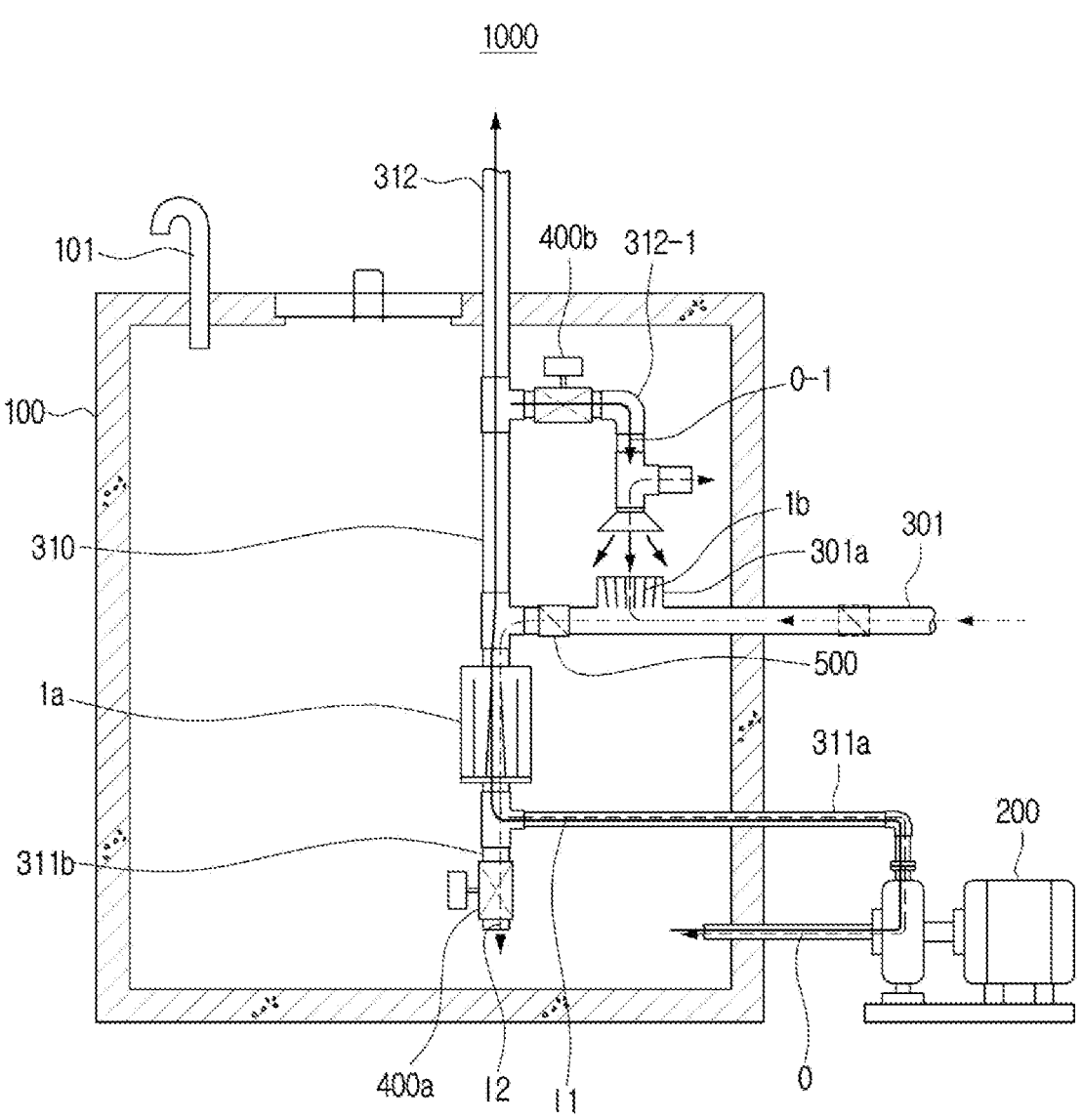
FIGS. 14 to 16 are views showing various embodiments in which the auxiliary filter is cleaned.
Figure 15:
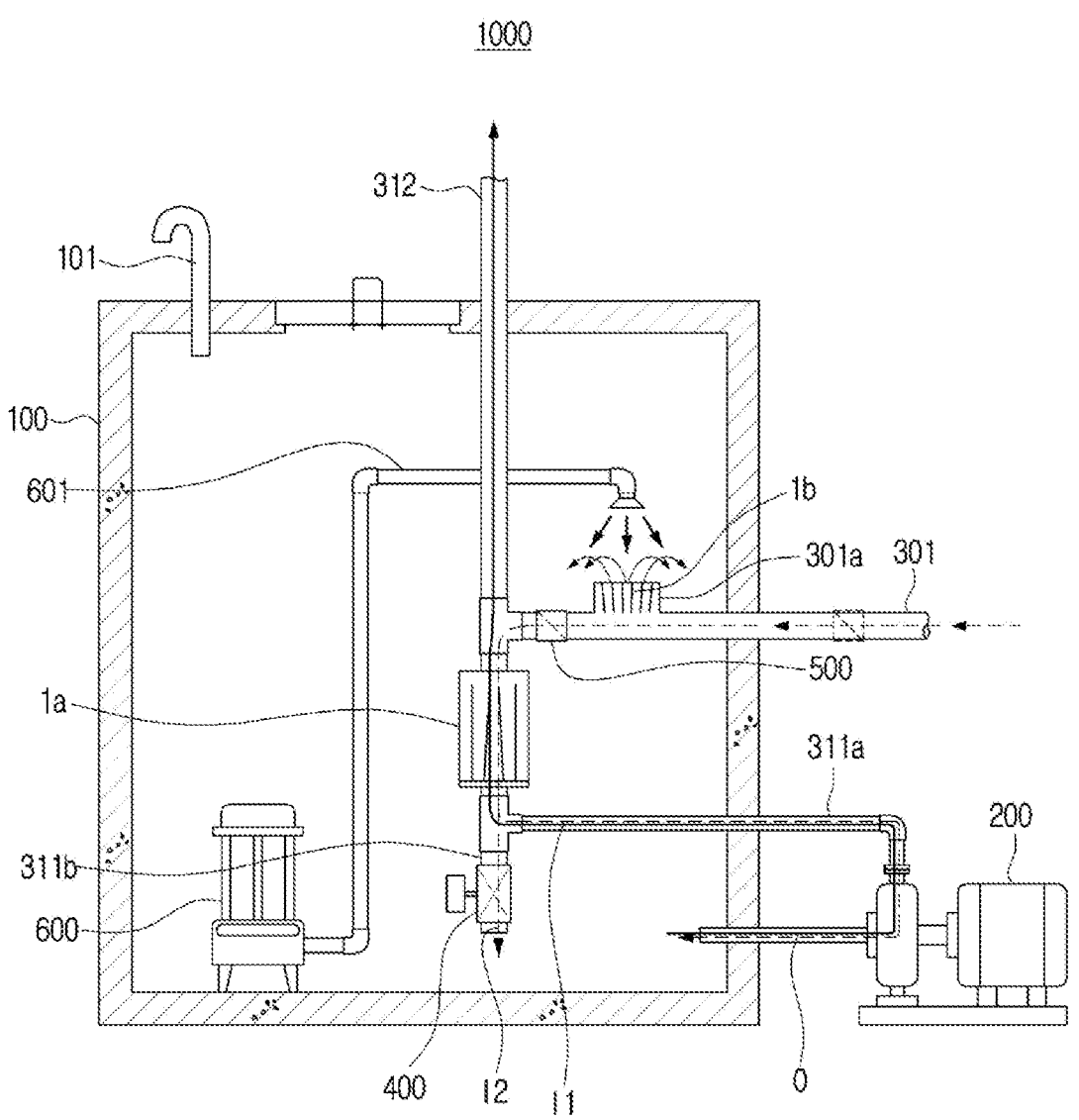
Figure 16:
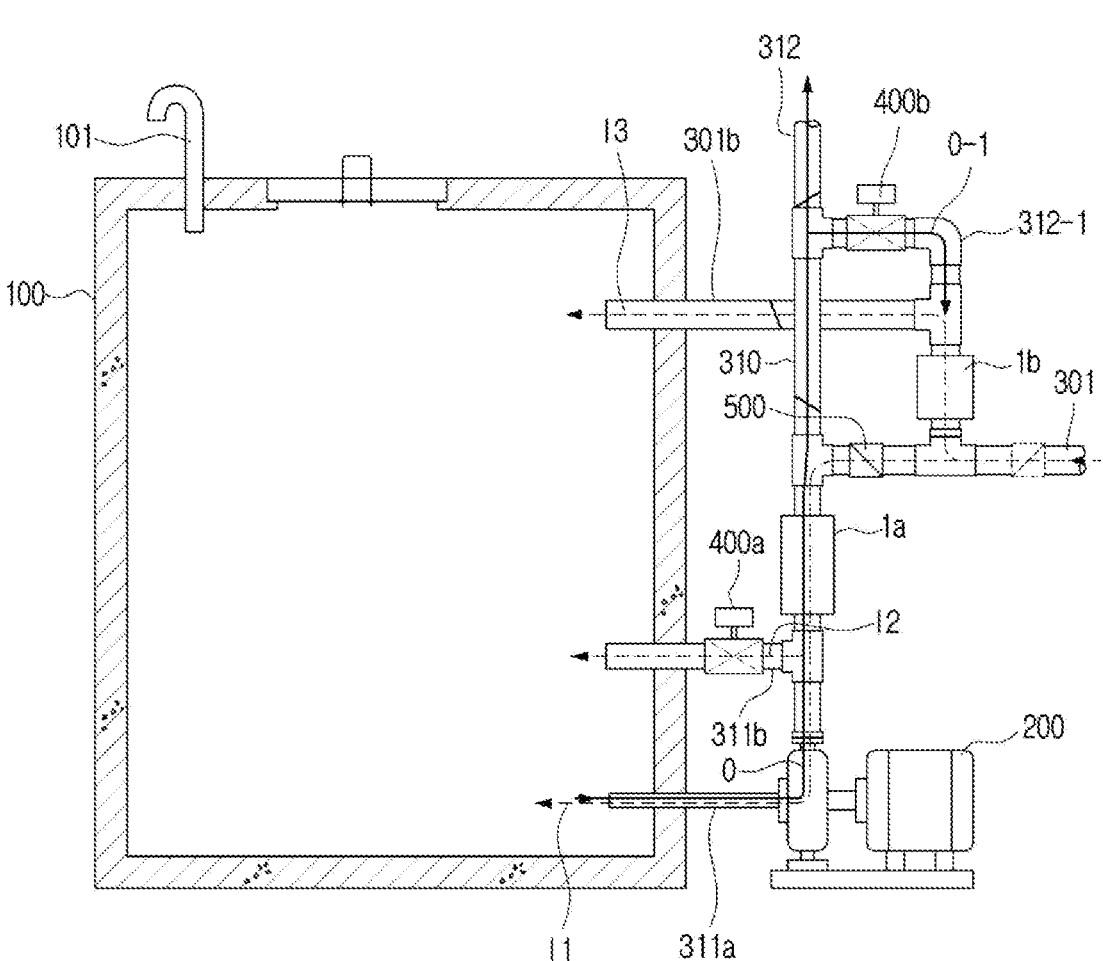

FIGS. 14 to 16 are views showing various embodiments in which the auxiliary filter is cleaned.

Referring to FIG. 14, the first pipe 310 may include a cleaning part 312-1 branched from the opposite end 312, opened toward the auxiliary hole 301a and disposed above the auxiliary hole 301a.

Accordingly, when the pump 200 is activated, some of the discharged sewage may be introduced into the tank 100 again through the cleaning part 312-1. At this point, an auxiliary filter 1b disposed below the cleaning part 312-1 may be cleaned by sewage passing through the cleaning part 312-1.

The foreign substance discharge device 1000 may further include a valve device 400b configured to selectively open and close the cleaning part 312-1. In other words, the valve device 400b may open the cleaning part 312-1 only when the auxiliary filter 1b is required to be cleaned. The valve device 400b may close the cleaning part 312-1 in a normal time when the auxiliary filter 1b is not required to be cleaned, so that the sewage may be smoothly discharged to the outside of the tank 100 without being leaked into the cleaning part 312-1.

Referring to FIG. 15, the foreign substance discharge device 1000 may further include an auxiliary pump 600 configured to spray cleaning water downward toward the auxiliary hole 301a. The auxiliary pump 600 refers to a submersible pump disposed inside the tank 100 and may spray the sewage stored in the tank 100 toward the auxiliary hole 301a. Accordingly, since the auxiliary filter 1b is periodically cleaned, the sewage may be smoothly moved into the tank 100 through the auxiliary hole 301a, so that the sewage congestion may be prevented.

In addition, when the pump 200 is driven, a backflow prevention device 500 may be closed, so that the sewage inside the tank 100 may be discharged to the outside of the tank 100 through the first pipe 310. Accordingly, when the backflow prevention device 500 is in the closed state, the sewage flowing into the inlet pipe 301 may pass through the auxiliary hole 301a and smoothly flow into the tank 100.

Referring to FIG. 16, the pump 200 may be disposed outside the tank 100. The inlet pipe 301 may introduce sewage therein from the outside of the tank 100. The first pipe 310 may be disposed outside the tank 100, have one end 311a communicating with the inside of the tank 100 via the pump 200, and discharge the sewage to an opposite end 312.

The inlet pipe 301 may have one section branched into a first connection part 301a and a second connection part 301b to communicate with the insides of the first pipe 310 and the tank 100, respectively.

The filter assembly may include a main filter 1a inserted into the first pipe 310, and an auxiliary filter 1b inserted into the second connection part 301b.

The first pipe 310 may include a cleaning part 312-1 branched from the opposite end 312 to communicate with the second connection part 301b.

Some of introduced sewage may be introduced into the tank 100 through the second connection part 301b, so that the sewage congestion may be prevented. In addition, the auxiliary filter 1b is disposed in the second connection part 301b, so that foreign substances may be prevented from unintentionally entering the inside of the tank 100. In addition, some of the discharged sewage may clean the auxiliary filter 1b along the cleaning part 312-1, so that the flow rate of the introduced sewage may be maintained.

In addition, when the pump 200 is driven, a backflow prevention device 500 may be closed, so that the sewage inside the tank 100 may be discharged to the outside of the tank 100 through the first pipe 310. Accordingly, when the backflow prevention device 500 is in the closed state, the sewage flowing into the inlet pipe 301 may pass through the auxiliary hole 301a and smoothly flow into the tank 100.

Figure 17:
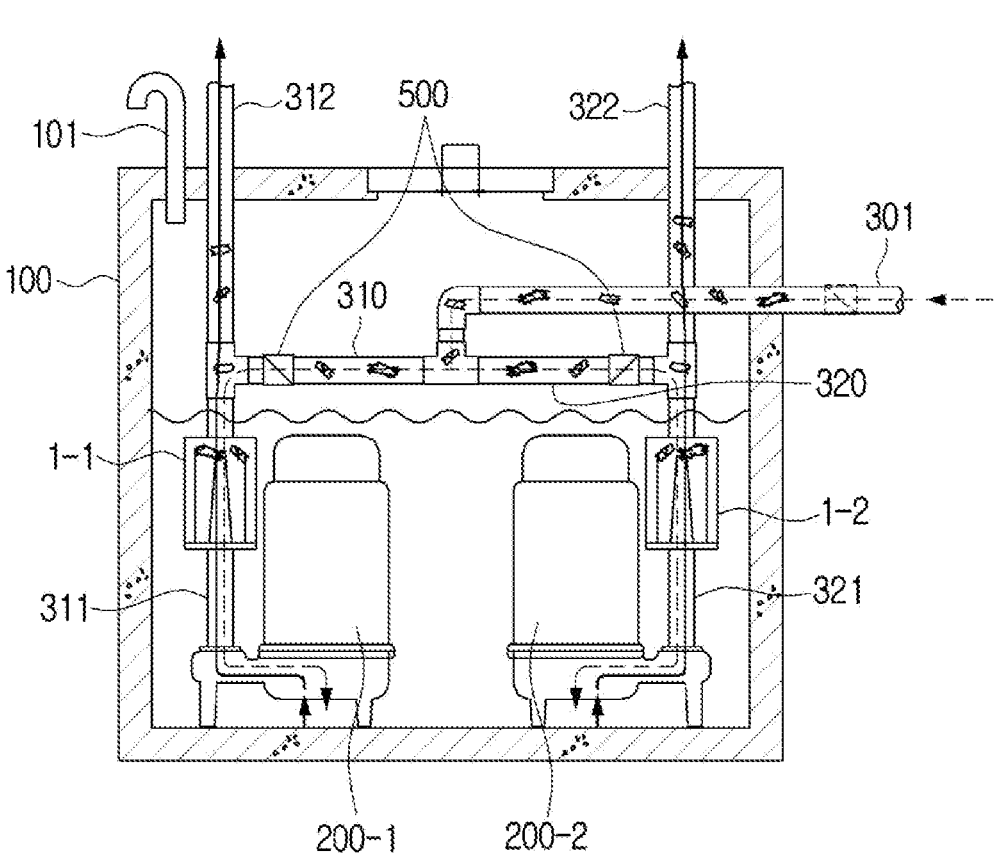
FIGS. 17 to 19 are views showing various structures of a foreign substance discharge device equipped with two pumps.
Figure 18:
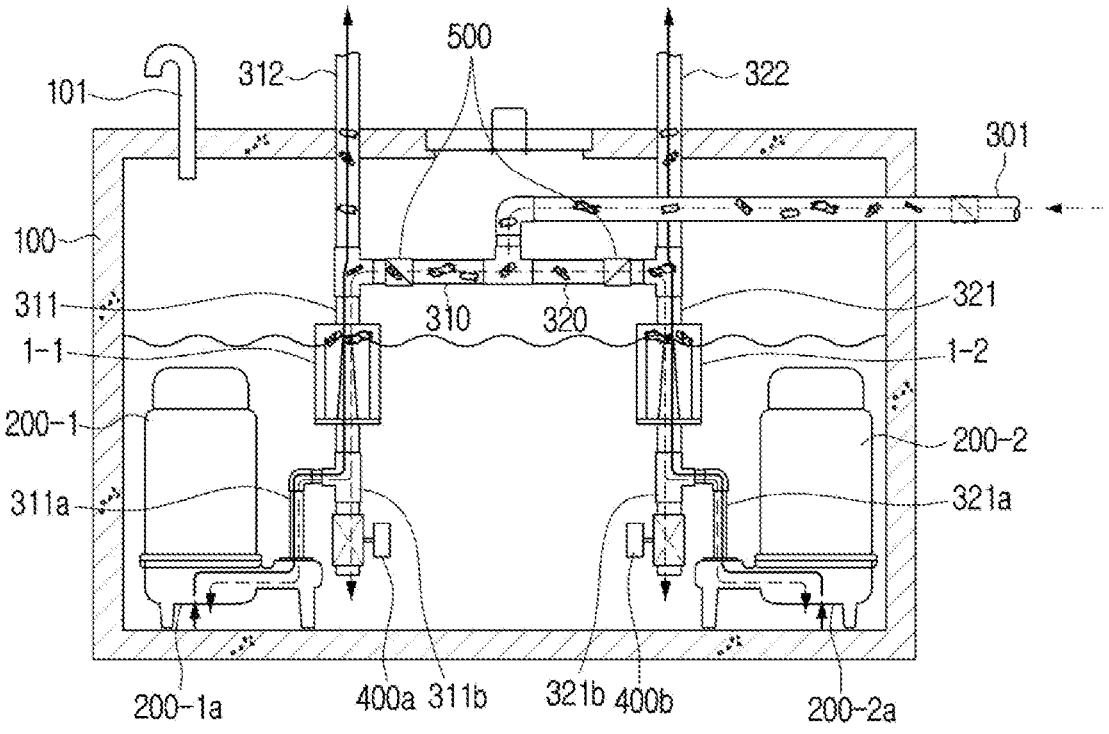
Figure 19:
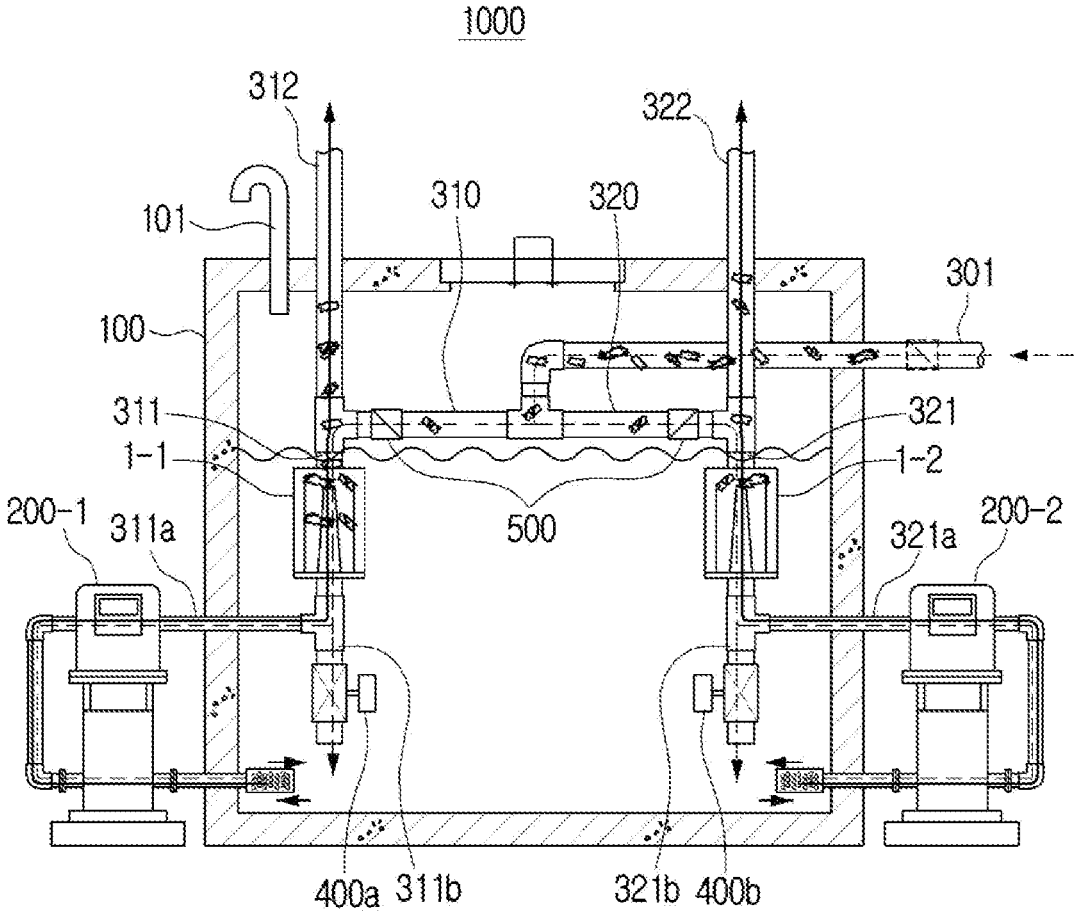

FIGS. 17 to 19 are views showing various structures of a foreign substance discharge device equipped with two pumps.

Referring to FIGS. 17 to 19, the pump 200 may include a first pump 200-1 and a second pump 200-2. The foreign substance discharge device 1000 may include a first pipe 310, a second pipe 320 and an inlet pipe 301.

The first pipe 310 may have one end 311 communicating with the first pump 200-1, and an opposite end 312 through which sewage may be discharged to the outside of the tank 100.

The second pipe 320 may have one end 321 communicating with the second pump 200-2, and an opposite end 322 through which the sewage may be discharged to the outside of the tank 100.

The inlet pipe 301 may have one end to which sewage is introduced from the outside of the tank 100, and an opposite end branched to communicate with the first pipe 310 and the second pipe 320.

The filter assemblies 1-1 and 1-2 may be disposed in the first pipe 310 and the second pipe 320, respectively.

Accordingly, the sewage may be filtered by the two filter assemblies 1-1 and 1-2 while being introduced. Thereafter, when the two pumps 200-1 and 200-2 are driven, foreign substances collected in the filter assemblies 1-1 and 1-2 may be discharged to the outside of the tank 100 by discharged sewage.

Referring to FIGS. 18 and 19, the one end 311 of the first pipe 310 may include a first drainage part 311a communicating with the first pump 200-1, and a second drainage part 311b communicating with the inside of the tank 100. Likewise, one end 321 of the second pipe 320 may include a third drainage part 321a communicating with the second pump 200-2, and a fourth drainage part 321b communicating with the inside of the tank 100. The foreign substance discharge device 1000 may further include a first valve device 400a configured to selectively open and close the second drainage part 311b, and a second valve device 400b configured to selectively open and close the fourth drainage part 321b.

Accordingly, some of the introduced sewage may be directly introduced into the tank 100 through the second drain part 311b and the fourth drain part 321b without passing through the pumps 200-1 and 200-2, so that the sewage congestion may be prevented.

When the first pump 200-1 is driven, the first valve device 400a may close the second drainage part 311b, and when the second pump 200-2 is driven the second valve device 400b may close the fourth drainage part 321b.

Accordingly, discharged sewage may be prevented from unintentionally returning to the inside of the tank 100 through the second drain part 311b or the fourth drain part 321b.

Referring to FIG. 18, the first and second pumps 200-1 and 200-2 may be disposed inside the tank 100, however, the present disclosure is not limited thereto. As shown in FIG. 19, the first and second pumps 200-1 and 200-2 may be disposed outside the tank 100.

Figure 20:
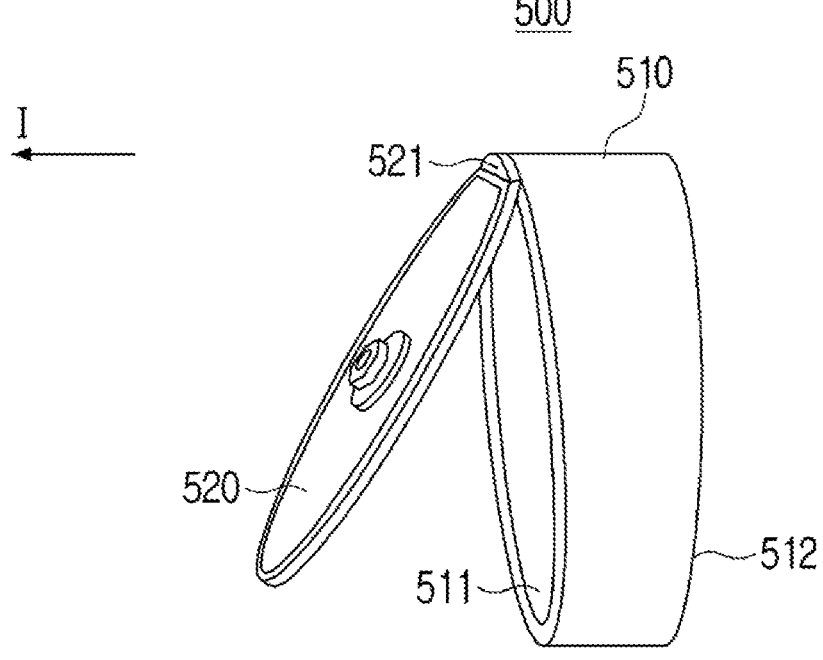
FIGS. 20 to 22 are views showing operations of the backflow prevention device according to one embodiment of the present disclosure.
Figure 21:
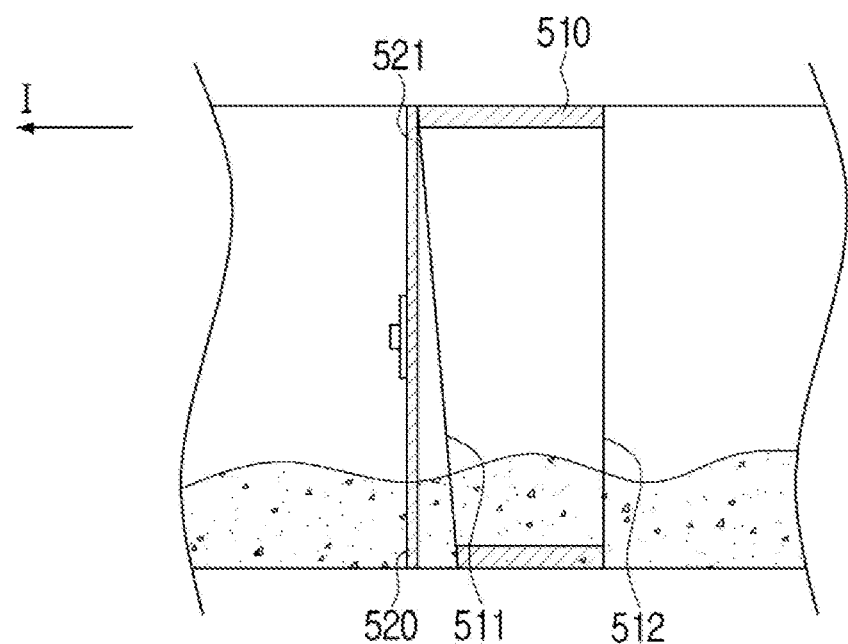
Figure 22:
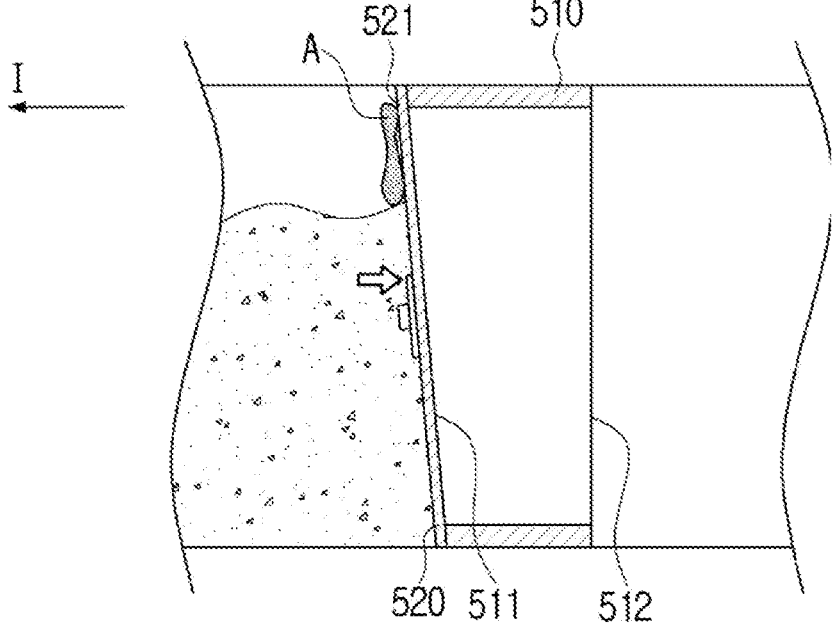

FIGS. 20 to 22 are views showing operations of the backflow prevention device according to one embodiment of the present disclosure.

Specifically, FIG. 20 is a perspective view showing the backflow prevention device 500 according to one embodiment of the present disclosure. FIGS. 21 and 22 are sectional views showing operations of the backflow prevention device 500 when the pump 200 is not operated and when the pump 200 is operated, respectively.

Referring to FIGS. 20 to 22, the backflow prevention device 500 may include a body 510 having both opened ends 511 and 512, and a disc 520 rotatably connected to the one end 511 of the body 510.

The backflow prevention device 500 may be implemented such that sewage flows only in the inlet direction I in specific regions of the pipes 301 and 310. The backflow prevention device 500 may be horizontally arranged at a site in which the first and second pipes 310 and 320 of the inlet pipe 301 meet each other, so that the backflow of sewage discharged by the pump 200 may be prevented.

The backflow prevention device 500 may have an approximately cylindrical shape, but the shape is not limited thereto, and may have various shapes such as square pillars and triangular pillars depending on the shape and use of the pipes 301 and 310.

The body 510 may have one end 511 on a downstream side so as to be inclined upward along the inlet direction I of the sewage. In addition, the disc 520 may have a shape corresponding to the one end 511 of the body 510, and may have one upper end 521 rotatably hinged to the body 510.

Referring to FIG. 21, when the pump 200 is not operated, the disc 520 may be disposed in a vertical direction due to dead weight, and accordingly, sewage may flow between the disc 520 and the one end 511 of the body 510 in the inlet direction I.

In addition, although not shown in the drawings, the disc 520 may be pushed by the introduced sewage and rotated in one direction (in a clockwise direction of FIG. 20), so that the sewage may flow more smoothly in the inlet direction I.

When the pump 200 is operated, the disc 520 may be pushed by some of the discharged sewage and rotated in one direction (in a counterclockwise direction of FIG. 22), so that the one end 511 of the body 510 may be closed.

Accordingly, the sewage discharged by the pump 200 may be stably discharged to the outside of the tank 100 through the first and second pipes 310 and 320 without flowing backward.

The foreign substances A in the discharged sewage may be attached to the disc 520 while the pump 200 is operated, and may fall downward to the one end 511 of the inclined body 510 and the closed disc 520 due to dead weight when the drainage pump 200 stops operating.

Accordingly, since the foreign substances A are not congested in the backflow prevention device 500 while being attached to the disc 520, the disc 520 may easily rotate and open and close the one end 511 of the body 510, so that the backflow of discharged sewage may be more effectively prevented.

Figure 23:
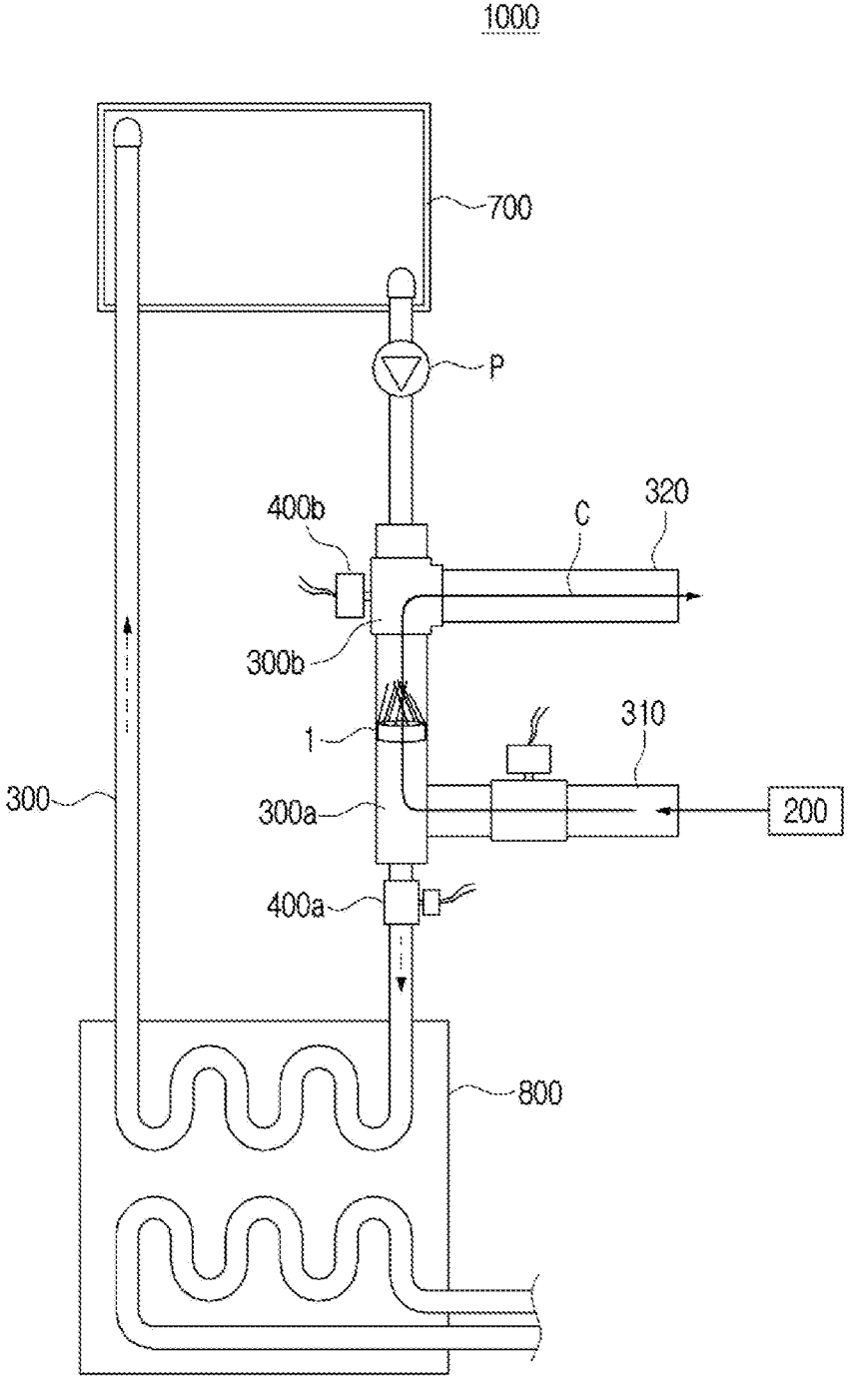
FIG. 23 is a view schematically showing a foreign substance discharge device in which a fluid circulates.

FIG. 23 is a view schematically showing a foreign substance discharge device in which a fluid circulates.

Referring to FIG. 23, the foreign substance discharge device 1000 may include a pipe 300, an inlet pipe 310, a discharge pipe 320, a first valve device 400a and a second valve device 400b.

The pipe 300 may provide a path through which the fluid circulates. For example, the fluid may have a temperature changed by a target device 700 and a heat exchange device 800 while circulating along the pipe 300. For example, the target device 700 may be a device in which a constant water temperature is required to be maintained in a place such as a bathroom or a swimming pool. For example, the fluid may circulate while obtaining heat from the heat exchange device 800 after taking heat from the target device 700. The fluid may circulate along the pipe 300 by a circulation pump P. However, the target device 700 and the heat exchange device 800 are not limited to the above examples, and the fluid may circulate along the pipe 300 without exchanging heat.

The inlet pipe 310 may be allowed to introduce cleaning water thereto from the outside by the pump 200, and may have one end communicating with a first point 300a of the pipe 300.

The discharge pipe 320 may have one end communicating with a second point 300b upstream of the first point 300a of the pipe.

The first valve device 400a may selectively open and close one of one end of the inlet pipe 310 and a downstream side of the first point 300a.

The second valve device 400b may selectively open and close one of the one end of the discharge pipe 320 and an upstream side of the second point 300b.

The filter assembly 1 may be inserted between the first point 300a and the second point 300b of the pipe 300.

For example, while the circulation pump P is operating and the fluid is circulating, the first valve device 400a may close the one end of the inlet pipe 310, and the second valve device 400b may close the one end of the discharge pipe 320.

Accordingly, the circulating fluid may stably circulate along the pipe 300 without being leaked to the outside. During the above state, the foreign substances included in the fluid may be filtered by the filter assembly 1.

When the filter assembly 1 is required to be cleaned, the first valve device 400a may close the downstream side of the first point 300a, and the second valve device 400b may close the upstream side of the second point 300b. Thereafter, the pump 200 may be driven and the cleaning water may pass through the inlet pipe 310, the section between the first point 300a and the second point 300b of the pipe 300, and the discharge pipe 320, so that the foreign substances filtered by the filter assembly 1 may be discharged to the outside of the pipe 300.

Figure 24:
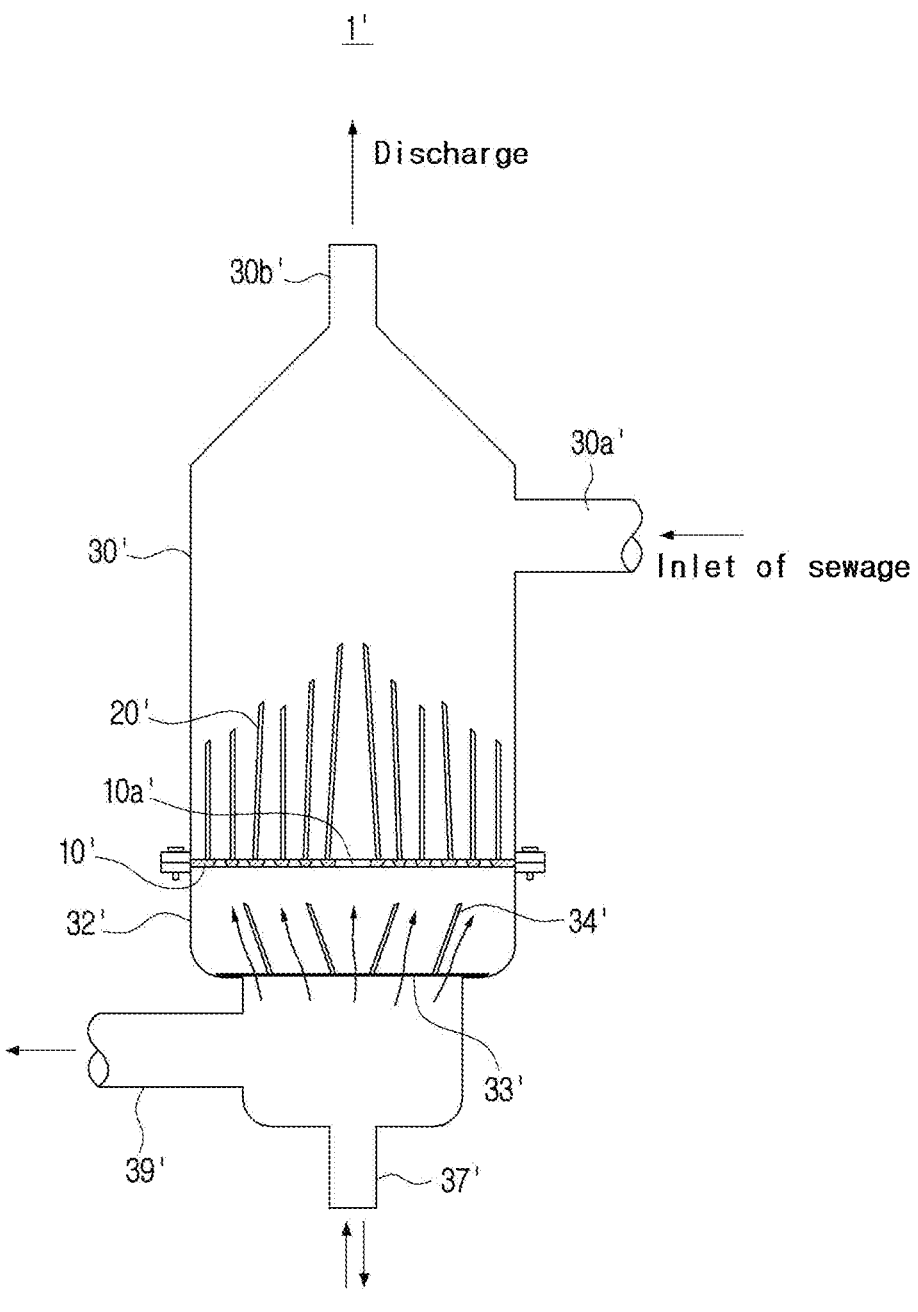
FIG. 24 is a sectional view showing an example in which a guide vane is coupled to the filter assembly according to one embodiment of the present disclosure.

FIG. 24 is a sectional view showing an example in which a guide vane is coupled to the filter assembly according to one embodiment of the present disclosure.

Referring to FIG. 24, in filter assembly 1', a plurality of protrusions 20' may be disposed on a plate 10' disposed on a bottom inside a housing 30'. The housing 30' may be formed on one side thereof with a sewage inlet part 30a' through which sewage is introduced and the housing 30' may be formed on an upper side thereof with a sewage discharge part 30b' through which the sewage is discharged to the outside.

Most of the configuration in the filter assembly 1' is similar to the above-described filter assembly 1, and it is different from the above-described filter assembly 1 in that guide vanes 34' are disposed below the housing 30'.

The guide vanes 34' may be disposed in an auxiliary housing 32' connected to a lower part of the housing 30' in a flange coupling manner. The guide vanes 34' may uniformly distribute sewage over the entire area of the plate 10', in which the sewage is introduced into the auxiliary housing 32' through a first port 37' and a plurality of holes 33' connected to the above-mentioned pump 200.

Accordingly, the sewage introduced into the housing 30' from the auxiliary housing 32' may be uniformly distributed without being concentrated onto some of a plurality of holes 10a' of the plate 10', so that a smooth flow may be maintained.

In FIG. 24, reference numeral 39' denotes a second port for introducing the sewage into the above-described tank 100.

The exemplary embodiments of the present disclosure have been shown and described. However, the present disclosure is not limited to the specific embodiments described above, it will be apparent to those skilled in the art in that various modifications are construed to be available within the scope of the claims without departing from the disclosure, and the modifications are intended to be within the scope of the claims.

What is claimed is:

1. A filter assembly, comprising:
a housing configured to define a flow path for allowing a fluid to move in a first direction or a second direction opposite to the first direction;
a plate disposed in the housing and including a through-hole; and
a plurality of protrusions protruding from the plate in the second direction,
wherein the through-hole includes: a main hole disposed in a center of the plate;
and a plurality of spray holes arranged to surround the main hole, and
wherein each of the plurality of spray holes has a sectional area gradually decreased in the second direction.

2. The filter assembly of claim 1, wherein at least one of the plurality of protrusions is inclined toward the main hole.

3. The filter assembly of claim 1, wherein at least one of the plurality of protrusions has one end that is bent.

4. A filter assembly, comprising:

a housing configured to define a flow path for allowing a fluid to move in a first direction or a second direction opposite to the first direction;

a plate disposed in the housing and including a through-hole; and a plurality of protrusions protruding from the plate in the second direction, wherein the through-hole includes: a main hole disposed in a center of the plate; and a plurality of spray holes arranged to surround the main hole, and wherein at least one of the protrusions includes an auxiliary protrusion protruding from each side surface thereof toward the second direction.

5. A filter assembly, comprising:

a housing configured to define a flow path for allowing a fluid to move in a first direction or a second direction opposite to the first direction;

a plate disposed in the housing and including a through-hole; and a plurality of protrusions protruding from the plate in the second direction, wherein the through-hole includes: a main hole disposed in a center of the plate; and a plurality of spray holes arranged to surround the main hole, and wherein at least one of the protrusions includes a radial protrusion extending radially from one end thereof.

\* \* \* \* \*